United States Patent [19]
Fujita et al.

[11] Patent Number: 5,031,958
[45] Date of Patent: Jul. 16, 1991

[54] FRONT STRUCTURE OF A MOTOR VEHICLE

[75] Inventors: Hideharu Fujita; Naoto Takata; Kazuo Ikeda, all of Hiroshima; Masaya Watanabe, Tokyo, all of Japan

[73] Assignee: Mazda Motor Corporation, Japan

[21] Appl. No.: 496,377

[22] Filed: Mar. 20, 1990

[30] Foreign Application Priority Data

Mar. 20, 1989 [JP] Japan .................................. 1-68762

[51] Int. Cl.⁵ .............................................. B62D 25/08
[52] U.S. Cl. .................................... 296/194; 180/89.1; 200/785; 296/188
[58] Field of Search ............... 180/89.1; 200/787, 785; 296/188, 194

[56] References Cited
U.S. PATENT DOCUMENTS

| | | | |
|---|---|---|---|
| 4,469,368 | 9/1984 | Eger | 180/89.1 |
| 4,883,309 | 11/1989 | Miyazaki et al. | 296/194 |
| 4,919,474 | 4/1990 | Adachi et al. | 296/188 |

Primary Examiner—Kenneth R. Rice
Attorney, Agent, or Firm—Thompson, Hine and Flory

[57] ABSTRACT

A wheel apron reinforcement being coupled with a wheel apron is joined, in the forward position of a suspension tower, with a front side frame extending inside an engine compartment, thereby improving rigidity of the engine compartment without increasing weight of the vehicle body. Further improvement in rigidity of the engine compartment can be achieved by fitting the wheel apron reinforcement to a hinge pillar or a recessed portion of the front side frame.

23 Claims, 8 Drawing Sheets

FRONT STRUCTURE OF A MOTOR VEHICLE

BACKGROUND OF THE INVENTION (a) Field of the Invention

This invention relates to a front structure of a motor vehicle, and particularly to an improvement in a connecting structure of a wheel apron reinforcement mounted in the upper side edge of an engine compartment.

(b) Description of the Prior Art

As a typical vehicle body structure in the vicinity of side portions of an engine compartment for a motor vehicle, the following arrangement has been known in the art. Longitudinally-extending front side frames having a closed cross-section are mounted on both right and left sides in the lower position of the vehicle body. Joined with the outer side-surfaces of the front side frames are wheel aprons which form side walls of the engine compartment. A portion of each wheel apron forms a wheel housing for accommodating a front wheel. The upper end portions of the wheel aprons are connected with reinforcing members having a U-shaped or L-shaped cross-section. This connecting relationship between the wheel apron and the reinforcing member results in a formation of a wheel apron reinforcement having a closed cross-section, thereby strengthening the upper side edge of the engine compartment. Further, a cross member is connected transversely with the right and left front side frames under the lower surfaces thereof. The front side frames may be provided with recessed portions on the outer side-surfaces thereof in order to avoid an interference with front wheels in the maximum steering position.

The aforementioned vehicle body structure is disclosed in Japanese Utility Model Application Laying Open Gazette No. 62-162173. According to this application, a front end of each front side frame of the vehicle body branches off in the vertical direction and this branch portion is joined with a flat reinforcement.

However, in motor vehicles having the above-mentioned vehicle body structure, the wheel apron reinforcements and the front side frames are subject to the shock load in case of collision of the motor vehicle. When the shock load is large enough to cause damage to the wheel apron reinforcements or the front side frames, effect of the shock load may reach engines and transmissions and results in the breakdown thereof. In addition, since formation of the recessed portions on the outer side-surfaces of the front side frames results in lower rigidity of the area around the recessed portions, the front side frames are increasingly susceptible to damage.

To overcome the above problems, one can easily come up with the idea of providing the wheel apron reinforcements and the front side frames respectively with reinforcing members. However, this causes the vehicle body to gain in weight thereof.

SUMMARY OF THE INVENTION

Accordingly, it is an object of the present invention to achieve higher rigidity of an engine compartment of a motor vehicle without increasing weight thereof by joining a wheel apron reinforcement disposed in the engine compartment with a front side frame.

To this end, the present invention provides the following structure. In an engine compartment, a front side frame is mounted so as to extend linearly from a dash panel toward the front of a vehicle body. A wheel apron reinforcement having a closed cross-section is disposed at the upper edge of a wheel apron. The wheel apron reinforcement is connected with the front side frame in the forward position of a suspension tower which supports a suspension. This structure leads to higher rigidity of the area around the wheel apron without increasing weight of the vehicle body.

To further enhance rigidity in this vehicle body structure, the rear end of the wheel apron reinforcement can be connected with a hinge pillar which supports a door hinge.

To yet further increase rigidity of the area in the vicinity of the recessed portion of the front side frame, the wheel apron reinforcement can be connected with this recessed portion.

BRIEF DESCRIPTION OF THE DRAWINGS

FIGS. 1 through 4 illustrate a first embodiment, in which:

FIG. 1 is a perspective view showing a vehicle body structure in the vicinity of a side portion of an engine compartment;

FIG. 2 is a plan view thereof;

FIG. 3 is a side view thereof;

FIG. 4 is an exploded perspective view thereof.

FIGS. 5 through 8 illustrate second embodiment, in which:

FIG. 5 is a perspective view showing a vehicle body structure in the vicinity of a side portion of an engine compartment;

FIG. 6 is a plan view thereof;

FIG. 7 is a side view thereof;

FIG. 8 is an exploded perspective view thereof.

DETAILED DESCRIPTION OF THE INVENTION (a) First Embodiment

Figure 1:
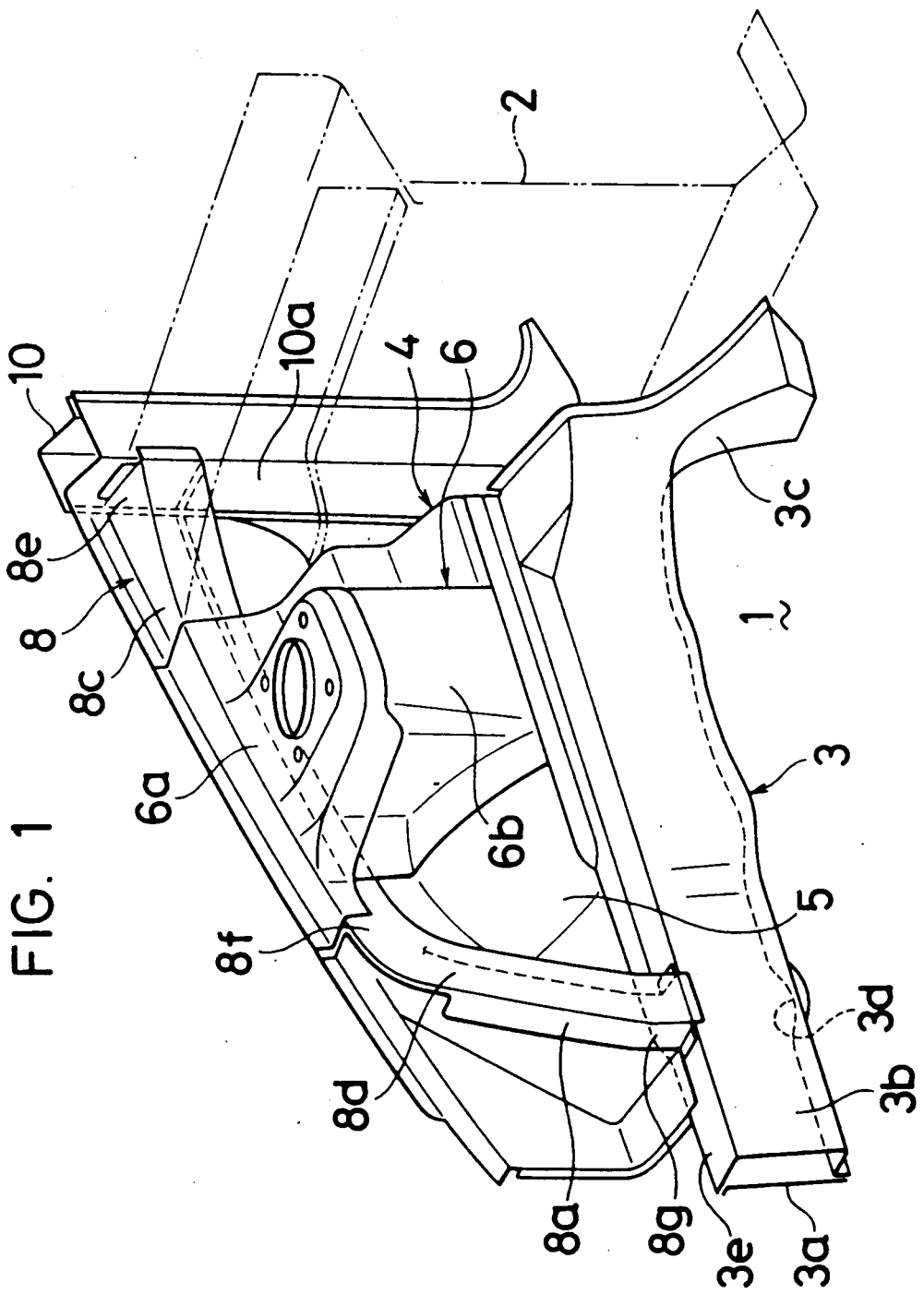

Referring to FIG. 1, front side frames 3 linearly extend toward the front of a vehicle body on both right and left sides of a dash panel 2 which forms a rear wall of an engine compartment 1.

Figure 4:
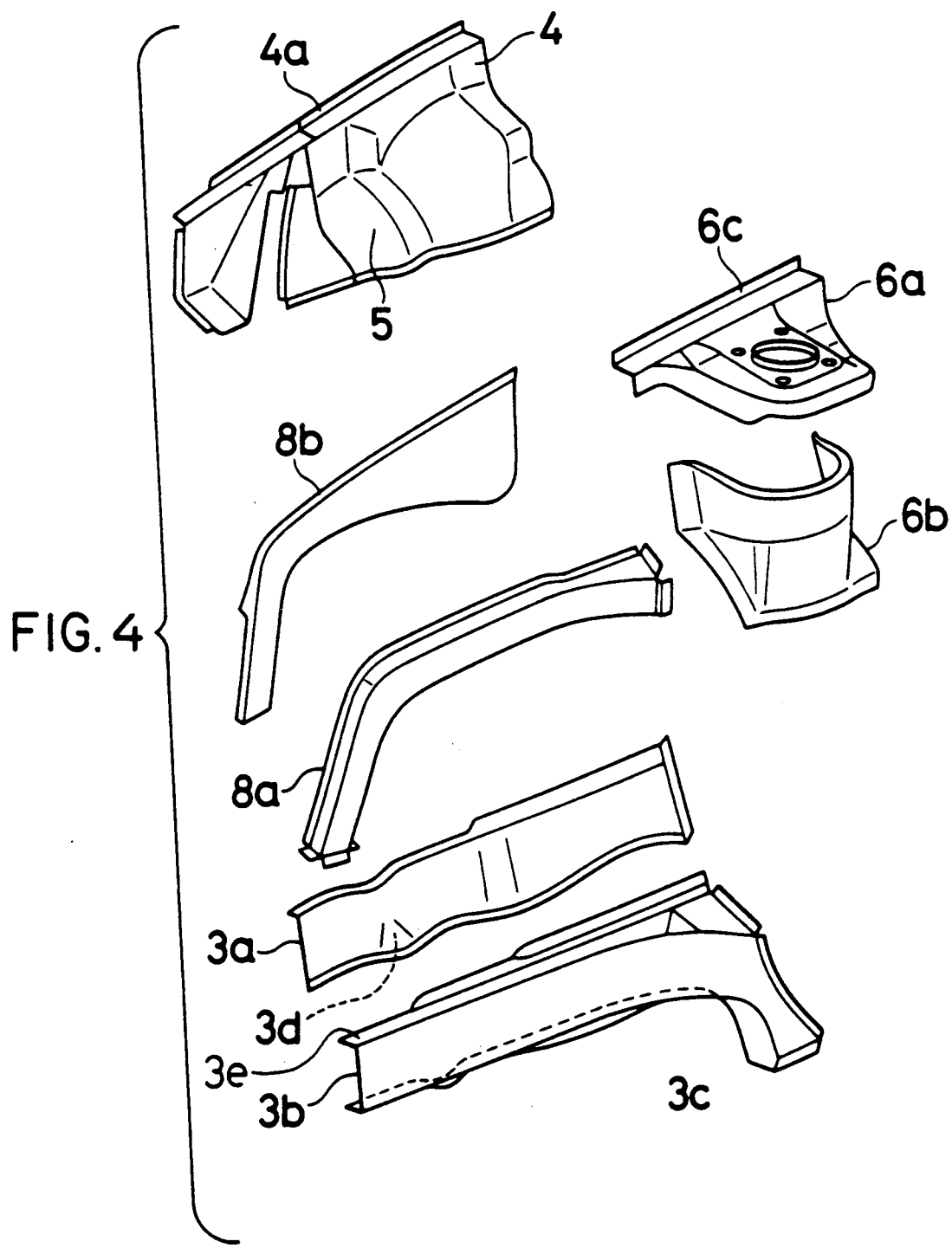
Figure 5:
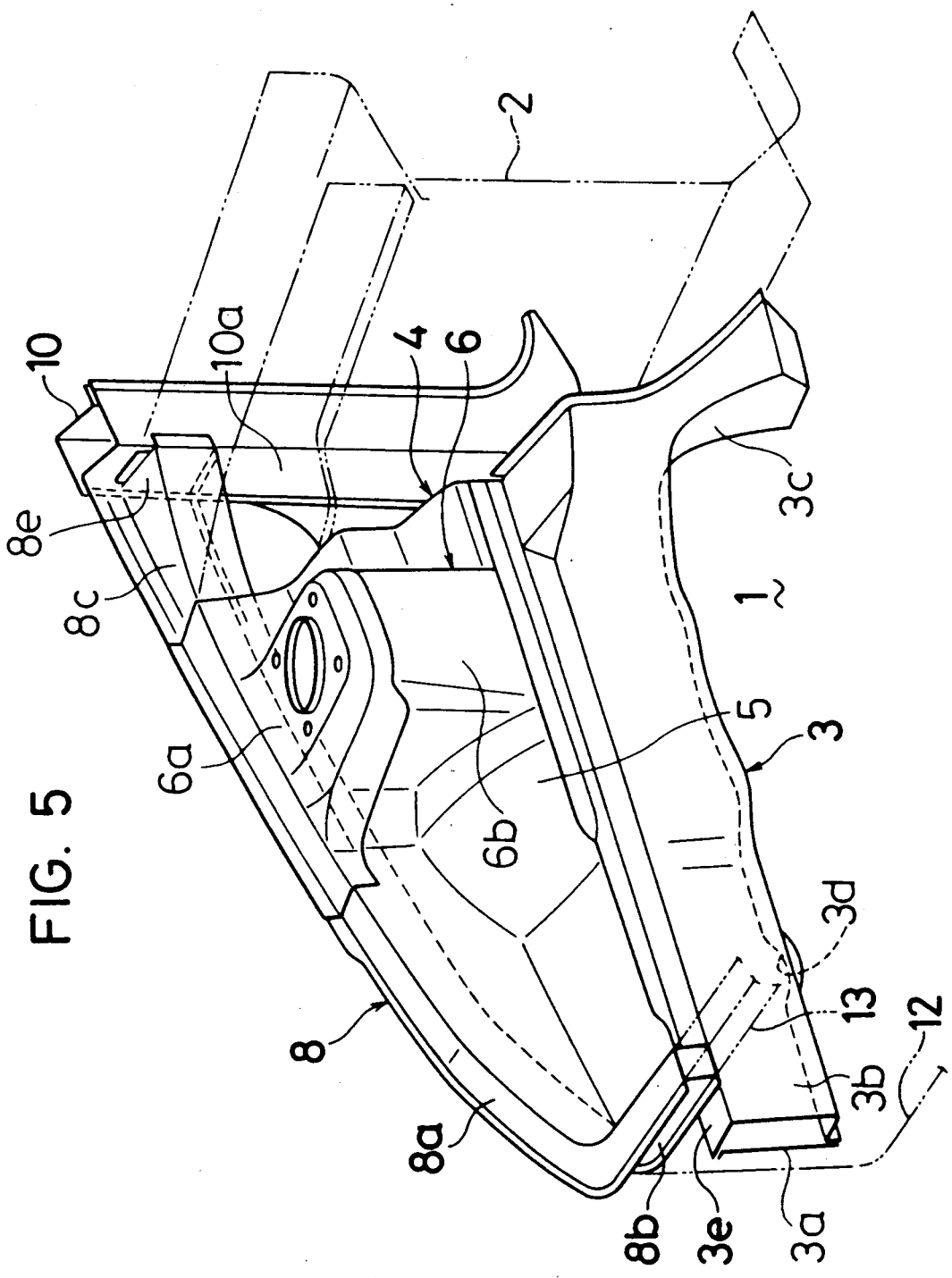
Figure 6:
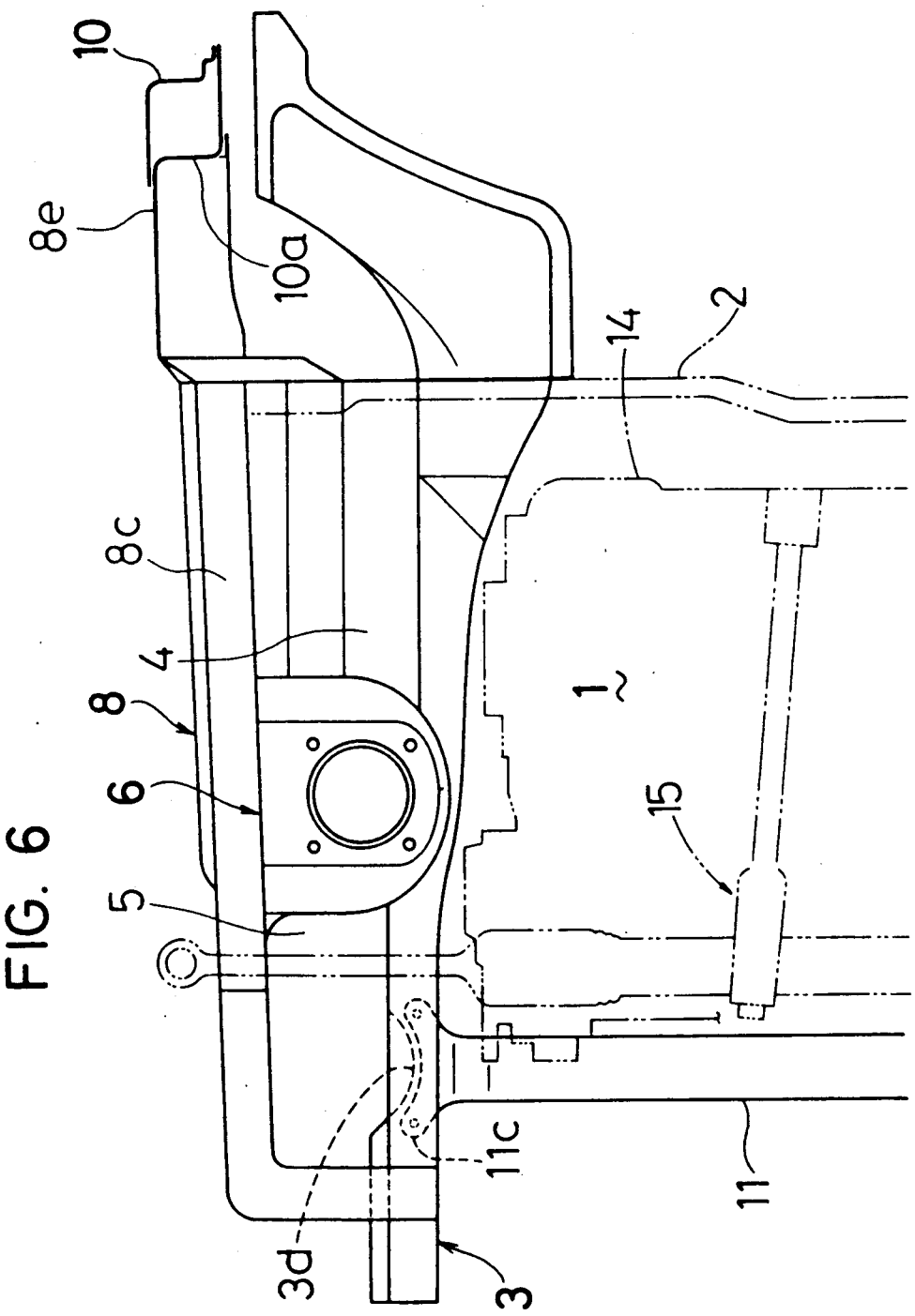
Figure 7:
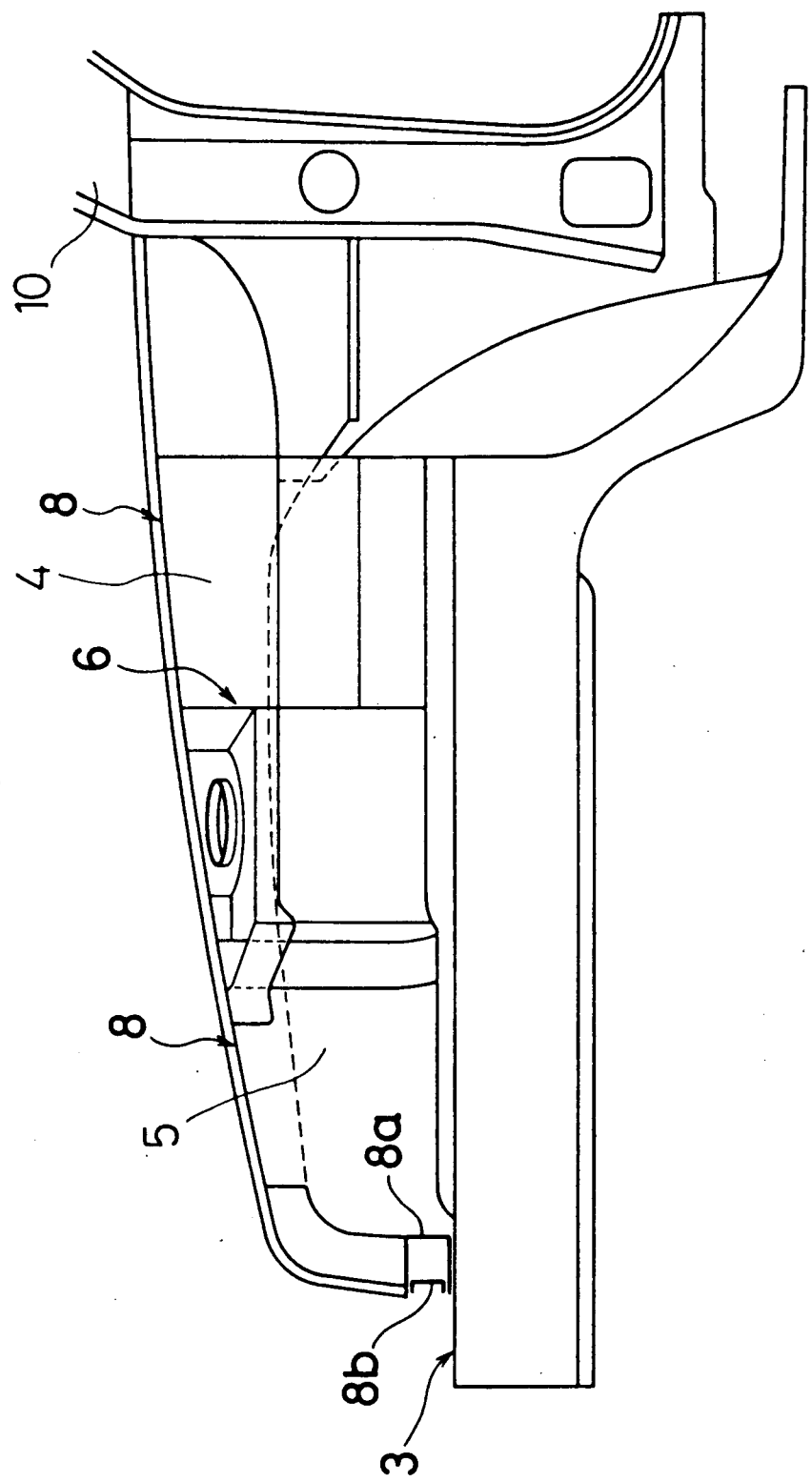
Figure 8:
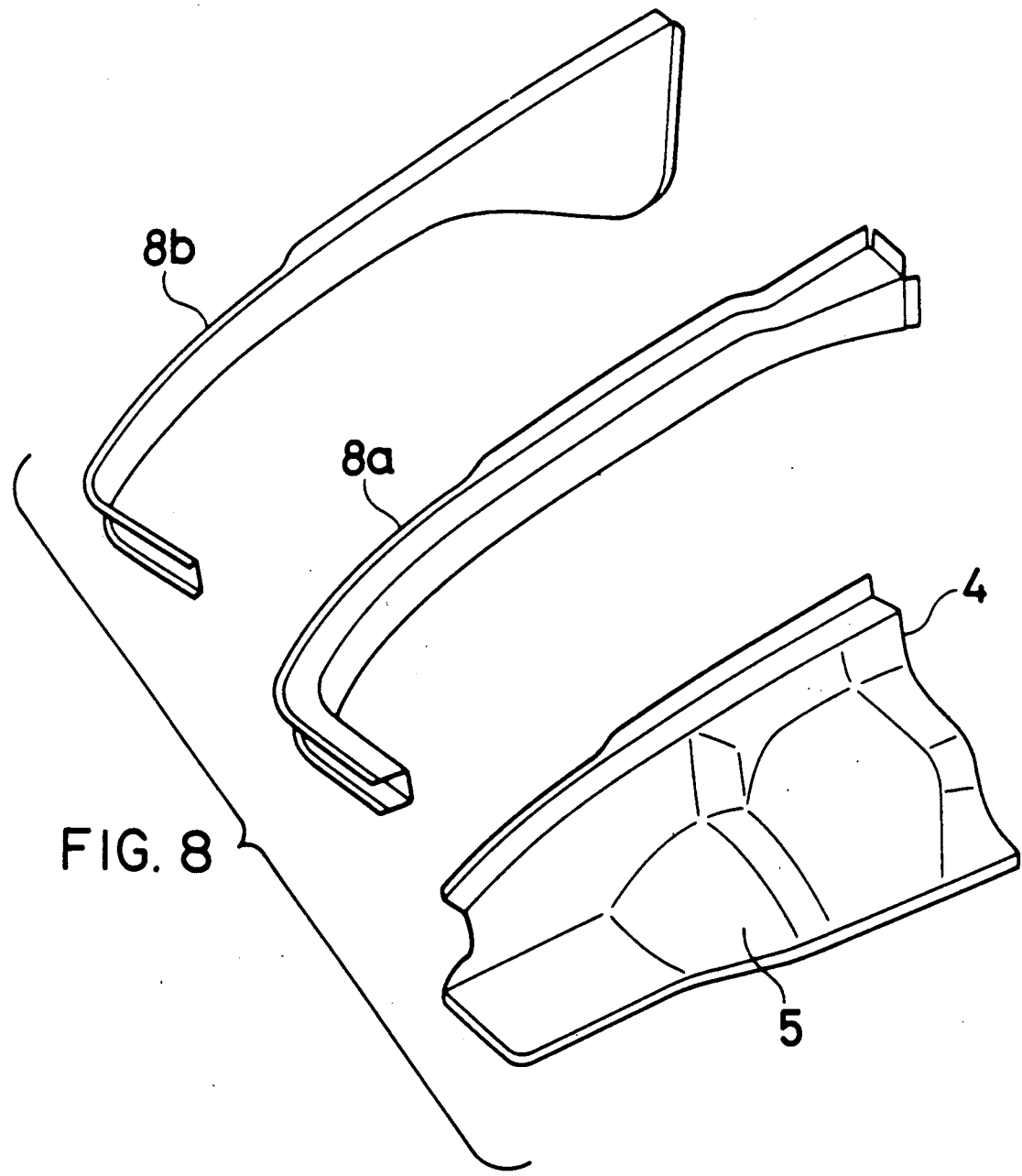

As shown in FIG. 4, the front side frame 3 is composed by coupling a frame outer 3a and a frame inner 3b, thus forming a closed cross-section therein. The rear end portion of the front side frame 3 extends so as to form a downwardly-curved lower surface 3c. The rear end portion of the front side frame 3 is connected with the dash panel 2.

A wheel apron 4 forming side wall of the engine compartment 1 is joined with the outer side-surface of the front side frame 3. A portion of the wheel apron 4 projects toward the center of the engine compartment 1 to provide a wheel housing 5 for accommodating a front wheel (not shown in the drawings). A suspension tower 6 for supporting a suspension (not shown in the drawings) is provided in the longitudinal center of the wheel housing 5. The suspension tower 6 comprises a suspension tower upper 6a wherein an outer edge 6c thereof is connected with an upper edge 4a of the wheel apron 4, and a suspension tower lower 6b located in the lower position of the suspension tower upper 6a. Compared with the wheel apron 4, the suspension tower 6 possesses higher rigidity. To avoid a possible interference between the front wheel and the front side frame 3 when the front wheel accommodated in the wheel housing 5 is in the maximum steering position, the frame outer 3a of the front side frame 3 is provided with a recessed portion 3d which recedes toward the frame inner 3b.

Figure 2:
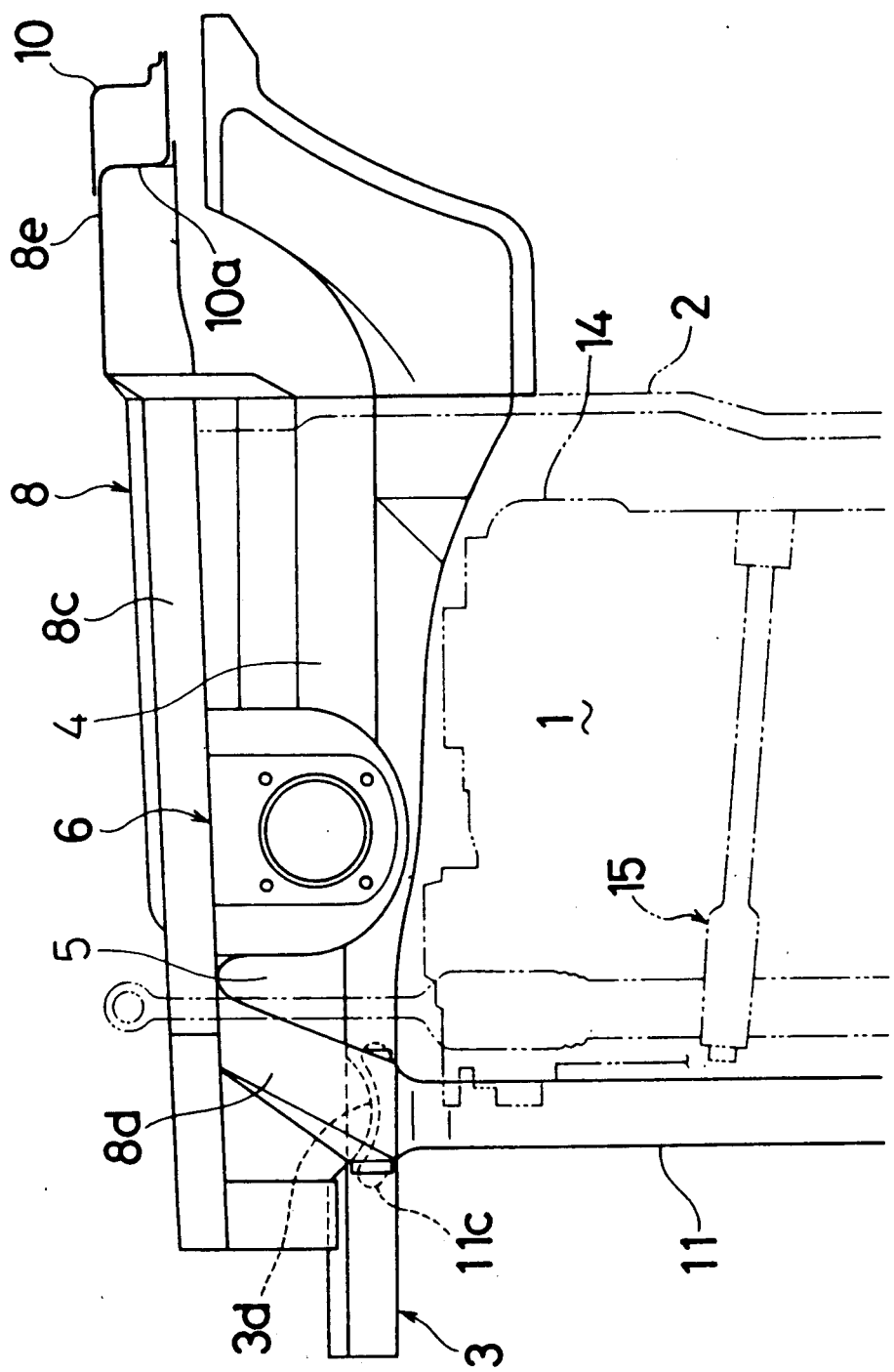

The feature of the present invention lies in a wheel apron reinforcement 8 joined with the inner side-surface in the vicinity of the upper edge 4a of the wheel apron 4. As shown in FIG. 4, the wheel apron reinforcement 8 which comprises a substantially U-shaped inner member 8a and a flat outer member 8b to form a closed cross-section extends in the longitudinal direction of the vehicle body. According to this structure, rigidity of the upper side edge of the engine compartment 1 can be improved. The inner member 8a and the outer member 8b are bent into L-shape so that the wheel apron reinforcement 8 comprises a horizontal part 8c and an inclined part 8d. The horizontal part 8c longitudinally and horizontally extends inside the engine compartment 1 and, as also shown in FIG. 2, the rear end 8e thereof passes through the dash panel 2 to be welded to a front surface 10a of a hinge pillar 10, a mounting member of a door hinge (not shown in the drawings). On the other hand, the inclined part 8d is curved at a front end 8f of the horizontal part 8c located in the forward position of the suspension tower 6 to extend toward the front side frame 3 so that a rear end 8g of the inclined part 8d is joined with an upper surface 3e of the front side frame 3 in the position corresponding to the recessed portion 3d.

Figure 3:
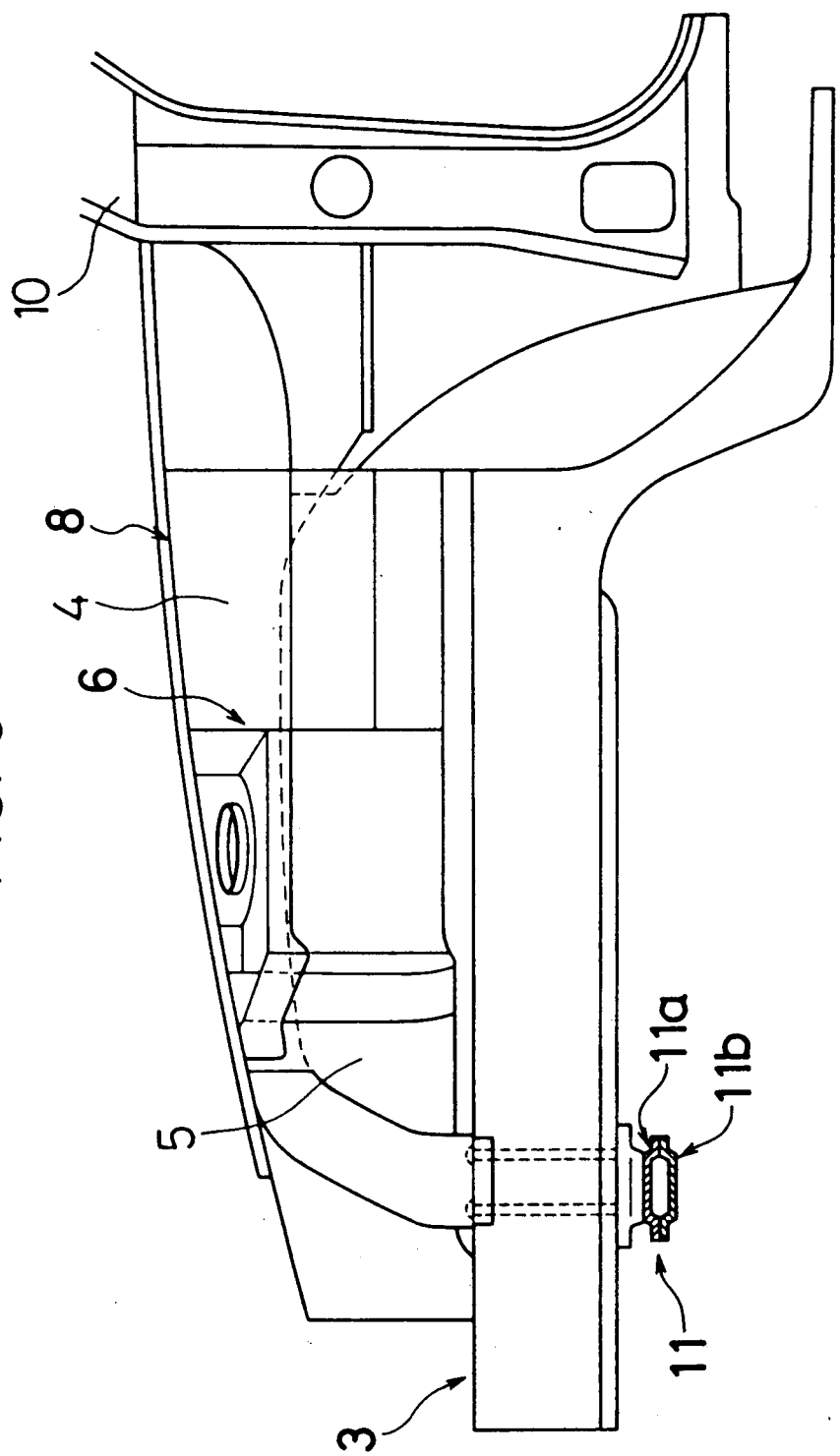

Referring to FIGS. 2 and 3, a front cross member 11 is interposed between the right and left front side frames 3 on the lower surfaces of the front end portions thereof. The front cross member 11 comprises a member upper 11a and a member lower 11b to form a closed cross-section. Right and left end portions 11c of the front cross member are bolted in the positions corresponding to the recessed portions 3d. As shown in FIG. 2, the right and left end portions 11c are configured to form a Y-shape in accordance with the shape of the recessed portions 3d. In FIG. 2, reference numeral 14 denotes a power unit composed of an engine and a transmission, and reference numeral 15 designates a steering unit.

In the conventional vehicle body structures, the wheel apron reinforcement 8 and the front side frame 3 improve rigidity respectively of the upper and the lower portions of the engine compartment 1. In contrast with the conventional structures, the structure of the present invention connects the wheel apron reinforcement 8 and the front side frame 3 in the front end portion of the vehicle body so that the wheel apron reinforcement 8 and the front side frame 3 can mutually reinforce rigidity thereof. As a result, higher rigidity of the area in the vicinity of the wheel apron 4 can be obtained. In addition, the wheel apron reinforcement 8 is joined, at the lower end 8g thereof, with the front side frame 3, and at the rear end 8e thereof, with the hinge pillar 10. And the suspension tower 6 having higher rigidity is located at the central portion of the wheel apron reinforcement 8. Accordingly, rigidity of the wheel apron reinforcement 8 itself is considerably higher than that of the conventional wheel apron reinforcements. In addition, rigidity of the front side frame 3 is further improved compared with the conventional front side frames since the lower end 8g of the wheel apron reinforcement 8 is joined with the area in the vicinity of the recessed portion 3d of the front side frame 3.

(b) Second Embodiment

Now, a second embodiment will be described as follows.

The second embodiment shows an alternate form of the connecting structure between the wheel apron reinforcement 8 and the front side frame 3 discussed in the first embodiment.

As shown in FIGS. 5 through 8, the inner member 8a and the outer member 8b are coupled to form the wheel reinforcement 8 having a closed cross-section. This wheel reinforcement 8 is joined to the outer side-surface of the wheel apron 4 to be disposed in the longitudinal direction of the vehicle body. The front portion of the wheel apron reinforcement 8 is curved downwardly to extend to the front end portion of the vehicle body, where the wheel apron reinforcement 8 forms a closed cross-section together with a shroud upper 13 to which a shroud panel 12 is attached. The lower surface of the wheel apron reinforcement 8 in the position corresponding to the front side frame 3 is joined with the upper surface 3e of the front side frame 3.

This structure of the vehicle body results in connections between the wheel apron reinforcement 8 and the front side frame 3 in a continuous closed cross-section, thus succeeding in improving rigidity of both elements.

What is claimed is:

1. A front structure of a motor vehicle comprising:
   a dash panel forming a rear wall of an engine compartment provided in a front portion of said motor vehicle;
   a wheel apron forming a side wall of said engine compartment;
   a front side frame mounted in a lower part of said engine compartment so as to extend linearly from said dash panel toward the front of said motor vehicle;
   a suspension tower jointed to said wheel apron, said suspension tower housing a suspension; and
   a wheel apron reinforcement having a closed cross-section, being jointed with an upper edge of said wheel apron, and a forward end of said reinforcement being joined to said front side frame forward of said suspension tower.

2. A front structure of a motor vehicle as defined in claim 1 further comprising a shroud upper being located in said front portion of said vehicle and being provided with a shroud panel; said wheel apron reinforcement being joined with an outer side-surface of said wheel apron, and a front end said wheel apron reinforcement extending toward the front of said vehicle and connected with said shroud upper.

3. A front structure of a motor vehicle as defined in claim 2 further comprising a hinge pillar provided a rear portion of said engine compartment for supporting a door hinge, a front end of said wheel apron reinforcement being joined with said front side frame, and a rear end of said wheel apron reinforcement being joined with said hinge pillar.

4. A front structure of a motor vehicle as defined in claim 1 further comprising a hinge pillar provided in a rear portion of said engine compartment for supporting a door hinge, a front end of said wheel apron reinforcement being jointed with said front side frame and a rear end thereof being joined with said hinge pillar.

5. A front structure of a motor vehicle as defined in claim 4 further comprising a front wheel provided in a side portion of said wheel apron; and said front side frame having a recessed portion for avoiding an interference with said front wheel, a front end of said wheel apron reinforcement being fitted into said recessed portion of said front side frame.

6. A front structure of a motor vehicle as defined in claim 5 wherein said wheel apron reinforcement is shaped to include a horizontal part extending in longitudinally of said vehicle, and an inclined part extending from a front end of said horizontal part downwardly toward a lower front portion of said vehicle.

7. A front structure of a motor vehicle as defined in claim 6 wherein a rear end of said horizontal part of said wheel apron reinforcement passes through said dash panel and is connected with said hinge pillar; and a front end of said inclined part of said wheel apron reinforcement is fitted into the recessed portion of said front side frame.

8. A front structure of a motor vehicle as defined in claim 1 further comprising a front wheel provided in the side portion of said wheel apron, said front side frame having a recessed portion for avoiding an interference with said front wheel, said wheel apron reinforcement wherein a front end thereof is fitted into said recessed portion of said front side frame.

9. A front structure of a motor vehicle as defined in claim 1 wherein said front side frame is formed by coupling a frame outer to a frame inner, thereby forming a closed cross-section therein.

10. A front structure of a motor vehicle as defined in claim 1 wherein a rear end of said front side frame is curved downwardly at the lower surface thereof and is joined with said dash panel.

11. A front structure of a motor vehicle as defined in claim 1 wherein said wheel apron reinforcement is formed by coupling a box-type inner member to a flat outer member, thereby forming a closed cross-section.

12. A front structure of a motor vehicle as defined in claim 1 wherein said wheel apron reinforcement is curved to comprise a horizontal part extending in the longitudinal direction of said vehicle and an inclined part extending from a front end of said horizontal part toward a lower front position of said vehicle.

13. A front structure of a motor vehicle comprising:
   a wheel apron forming a side wall of an engine compartment provided in a front portion of said motor vehicle;
   a side portion of said wheel apron being shaped to receive a front wheel therein;
   a front side frame being mounted in a lower part of said engine compartment and extending in a longitudinal direction of said motor vehicle, said front side frame having a recessed portion to accommodate said front wheel; and
   a wheel apron reinforcement having a closing cross-section, being jointed with an upper edge of said wheel apron, and a forward end of said reinforcement being fitted into said recessed portion of said front side frame.

14. A front structure of a motor vehicle as defined in claim 3 wherein said front side frame is formed by coupling a frame outer and a frame inner to form a closed cross-section, and said frame outer is provided with a recessed portion which recedes toward said frame inner.

15. A front structure of a motor vehicle comprising:
   a wheel apron forming a side wall of an engine compartment provided in a front portion of said motor vehicle;
   a front side frame mounted in a lower part of said engine compartment and extending in a longitudinal direction of said motor vehicle;
   a suspension tower jointed to said wheel apron, said suspension tower housing a suspension;
   a hinge pillar provided in a rear portion of said engine compartment for supporting a door hinge; and
   a wheel apron reinforcement having a closed cross-section and being joined with an upper edge of said wheel apron, a front end of said wheel apron reinforcement being joined with said front side frame forward of said suspension tower, and a rear end of said reinforcement being jointed with said hinge pillar.

16. A front structure of a motor vehicle as defined in claim 15 further comprising a front wheel provided in a side portion of said wheel apron; and said front side frame having a recessed portion for avoiding an interference with said front wheel, a front end of said wheel apron reinforcement being fitted into said recessed portion of said front side frame.

17. A front structure of a motor vehicle as defined in claim 16 wherein said wheel apron reinforcement is shaped to include a horizontal part extending longitudinally of said vehicle, and an inclined part extending from a front end of said horizontal part downwardly toward a lower front portion of said vehicle.

18. A front structure of a motor vehicle as defined in claim 17 wherein a rear end of said horizontal part of said wheel apron reinforcement passes through said dash panel and is connected with said hinge pillar; and a front end of said inclined part of said wheel apron reinforcement is fitted into a recessed portion of said front side frame.

19. A front structure of a motor vehicle as defined in claim 15 wherein said front side frame is formed by coupling a frame outer to a frame inner, thereby forming a closed cross-section therein.

20. A front structure of a motor vehicle as defined in claim 15 wherein a rear end of said front side frame is curved downwardly at a lower surface thereof and is joined with said dash panel.

21. A front structure of a motor vehicle as defined in claim 15 wherein said wheel apron reinforcement is formed by coupling a box-type inner member to a flat outer member, thereby forming a closed cross-section.

22. A front structure of a motor vehicle as defined in claim 15 wherein said wheel apron reinforcement is curved to comprise a horizontal part extending in the longitudinal direction of said vehicle body and an inclined part extending from a front end of said horizontal part toward a lower front position of said vehicle.

23. A front structure of a motor vehicle as defined in claim 15 further comprising a shroud upper being located in said front portion of said motor vehicle and being provided with a shroud panel; said wheel apron reinforcement being joined with an outer side-surface of said wheel apron, and a front end of said wheel apron reinforcement extending toward the front of said vehicle and connected with said shroud upper.

* * * * *